United States Patent
Ardalan et al.

(10) Patent No.: US 6,747,981 B2
(45) Date of Patent: *Jun. 8, 2004

(54) REMOTE ACCESS TO ELECTRONIC METERS USING A TCP/IP PROTOCOL SUITE

(75) Inventors: Sasan H. Ardalan, Cary, NC (US); David E. Van den Bout, Apex, NC (US)

(73) Assignee: Elster Electricity, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/975,582

(22) Filed: Oct. 10, 2001

(65) Prior Publication Data

US 2002/0044559 A1 Apr. 18, 2002

Related U.S. Application Data

(63) Continuation of application No. 09/022,718, filed on Feb. 12, 1998, now Pat. No. 6,396,839.
(60) Provisional application No. 60/039,716, filed on Feb. 12, 1997.

(51) Int. Cl.$^7$ ............................................. H04L 12/56
(52) U.S. Cl. .................. 370/401; 320/352; 340/870.02; 340/870.11; 379/106.03
(58) Field of Search ..................... 340/870.01, 870.02, 340/870.07, 870.11; 370/241, 249, 252, 352–4, 389, 400–402, 419, 458, 438, 463, 489; 379/111, 102.11, 106.03, 106.04, 106.07, 106.08, 114.01, 1.01

(56) References Cited

U.S. PATENT DOCUMENTS

| | | | |
|---|---|---|---|
| 5,495,239 A | 2/1996 | Ouellette | 340/870.02 |
| 5,548,527 A | 8/1996 | Hemminger et al. | 364/492 |
| 5,553,094 A | 9/1996 | Johnson et al. | 375/200 |
| 5,572,438 A | 11/1996 | Ehlers et al. | 364/492 |
| 5,627,759 A | 5/1997 | Bearden et al. | 364/483 |
| 5,684,799 A | 11/1997 | Bigham et al. | 370/397 |
| 5,691,715 A | 11/1997 | Ouellette | 340/870.09 |
| 5,696,501 A | 12/1997 | Ouellette et al. | 340/870.02 |
| 5,696,765 A | 12/1997 | Safadi | 370/436 |
| 5,699,276 A | 12/1997 | Roos | 364/514 A |
| 5,714,931 A | 2/1998 | Petite et al. | 340/539 |

(List continued on next page.)

OTHER PUBLICATIONS

Corcoran, P.M. et al., "CEBus Network Access via the World–Wide–Web," *International Conference on Consumer Electronics*, Jun. 5–7, 1996, 236–237.

Corcoran, P.M. et al., "Browser–Style Interfaces to a Home Automation Network," *IEEE Trans. on Consumer Electronics*, Nov. 1, 1997, 43(4), 1063–1069.

*Primary Examiner*—David Vincent
(74) *Attorney, Agent, or Firm*—Woodcock Washburn LLP

(57) ABSTRACT

An electronic meter incorporates a TCP/IP protocol suite and an HTTP server to provide two-way access to the meter data. Alternatively, the TCP/IP protocol suite may be incorporated into a gateway serving multiple meters connected through a power line or wireless two-way network. The gateway may incorporate an HTTP server for accessing data from multiple meters and for transmission of data to individual meters. Other aspects of the disclosed system include the use of a common gateway interface for remote access to meter data and to set meter parameters using HTML forms in HTTP browsers; remote reading and setting of multiple meter parameters using a TCP/IP protocol suite; a TCP/IP protocol suite implemented in designated nodes in a CEBus LAN with remote access through TCP/IP to routers and brouters and to individual meters on the LAN; and an SLIP-PPP enabled gateway for remote TCP/IP access through a serial interface to a single or multiple meter parameters.

42 Claims, 5 Drawing Sheets

U.S. PATENT DOCUMENTS

| | | | |
|---|---|---|---|
| 5,748,104 A | 5/1998 | Argyroudis et al. | 340/870.11 |
| 5,751,914 A | 5/1998 | Coley et al. | 395/51 |
| 5,751,961 A | 5/1998 | Smyk | 395/200.47 |
| 5,754,772 A | 5/1998 | Leaf | 395/200.33 |
| 5,754,830 A | 5/1998 | Butts et al. | 395/500 |
| 5,768,148 A | 6/1998 | Murphy et al. | 364/492 |
| 5,778,368 A | 7/1998 | Hogan et al. | 707/10 |
| 5,896,382 A | 4/1999 | Davis et al. | 370/401 |
| 5,926,103 A | 7/1999 | Petite | 340/825.19 |
| 5,926,531 A | 7/1999 | Petite | 379/144 |
| 6,028,522 A | 2/2000 | Petite | 340/641 |
| 6,218,953 B1 | 4/2001 | Petite | 340/641 |
| 6,233,327 B1 | 5/2001 | Petite | 379/155 |
| 6,430,268 B1 | 8/2002 | Petite | 379/39 |
| 6,437,692 B1 | 8/2002 | Petite et al. | 340/540 |
| 2001/0002210 A1 | 5/2001 | Petite | 379/155 |
| 2001/0024163 A1 | 9/2001 | Petite | 340/628 |
| 2002/0012323 A1 | 1/2002 | Petite et al. | 370/252 |
| 2002/0013679 A1 | 1/2002 | Petite | 702/188 |
| 2002/0019712 A1 | 2/2002 | Petite et al. | 702/61 |
| 2002/0019725 A1 | 2/2002 | Petite | 702/188 |
| 2002/0027504 A1 | 3/2002 | Davis et al. | 340/540 |
| 2002/0031101 A1 | 3/2002 | Petite et al. | 370/310 |
| 2002/0125998 A1 | 9/2002 | Petite et al. | 340/286.01 |
| 2002/0169643 A1 | 11/2002 | Petite et al. | 705/5 |
| 2003/0036810 A1 | 2/2003 | Petite | 700/9 |
| 2003/0036822 A1 | 2/2003 | Davis et al. | 700/295 |

REMOTE ACCESS TO ELECTRONIC METERS USING A TCP/IP PROTOCOL SUITE

This Application is a continuation of U.S. patent application Ser. No. 09/022,718, now U.S. Pat. No. 6,396,839, filed on Feb. 12, 1998, which claims priority to U.S. provisional patent application No. 60/039,716, filed Feb. 12, 1997.

FIELD OF THE INVENTION

The present invention relates generally to electronic meters and automatic meter reading, and more particularly to TCP/IP-enabled electronic meters for remote two-way access over local area networks and wide area networks.

BACKGROUND OF THE INVENTION

The present invention relates to automatic meter reading (AMR) systems for use in automatically reading electrical energy and other utility meters (e.g., water and gas meters). The invention is more particularly intended for, although not limited to, use in an electronic meter. Further background information on electronic meters can be found in U.S. Pat. No. 5,548,527, Aug. 20, 1996, titled "Programmable Electrical Energy Meter Utilizing a Non-Volatile Memory" (assigned to ABB Power T&D Company Inc.) Further background on automatic meter reading systems can be found in U.S. Pat. No. 5,553,094, Sep. 3, 1996, titled "Radio Communication Network for Remote Data Generating Stations."

SUMMARY OF THE INVENTION

The present invention, as discussed in greater detail below, involves the use of a TCP/IP protocol suite and a hypertext transfer protocol (HTTP) server. The terms "HTTP" and "TCP/IP" are well known in the networking and telecommunications arts. For example, TCP/IP refers to a well known set of protocols for linking dissimilar devices across networks. The invention also involves the use of a "gateway". A gateway is a node in a network that connects two otherwise incompatible networks. Gateways may perform code and protocol conversion processes. A "protocol" is a set of rules or procedures relating to the format and timing of data transmissions between two devices. Protocols typically break a file into equal-size blocks or packets. These are sent and the receiving device uses a mathematical procedure to determine whether the block or packet was received accurately.

An electronic metering system in accordance with the present invention comprises a wide area network (WAN) operating in accordance with a TCP/IP protocol; a local area network (LAN) comprising a plurality of meters each of which includes meter electronics for measuring a prescribed quantity supplied by a utility and memory for storing measured data and meter control parameters; a gateway operatively coupled to the LAN and the WAN; and an HTTP server operatively coupled to the LAN and the gateway, whereby the WAN is provided remote access to the measured data and control parameters of the meters.

Presently preferred embodiments of the invention further include a CGI (common gateway interface) application coupled to the HTTP server for use in accessing the measured data. Alternatively, the inventive system may include a virtual machine coupled to the HTTP sever for use in accessing the data.

The prescribed quantity is preferably electricity, water or gas.

The HTTP server and CGI application may be embedded in each of the meters or, alternatively, embedded in the gateway.

Other features of the present invention are disclosed below.

DETAILED DESCRIPTION OF PREFERRED EMBODIMENTS

The present invention, in one embodiment, employs an electronic meter incorporating a TCP/IP protocol suite and an HTTP server for two-way access to the meter data. In another embodiment of the invention, the TCP/IP protocol suite is incorporated into a gateway serving multiple meters connected through a power line or wireless two-way network. The gateway employed in a second embodiment of the present invention incorporates an HTTP server for accessing data from multiple meters and for transmission of data to individual meters.

Figure 1:
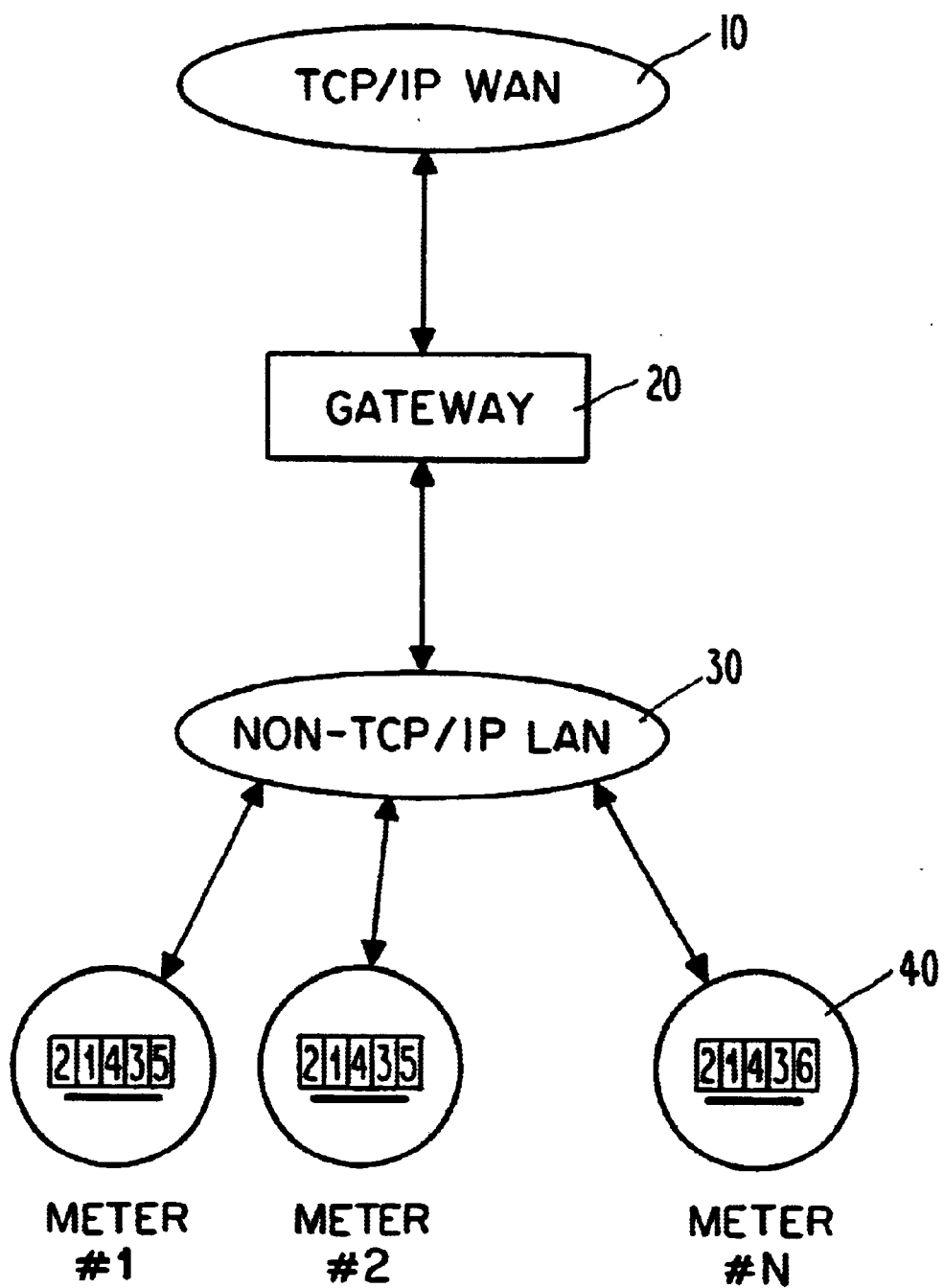
FIG. 1 schematically depicts an AMR network comprising a wide area network 10, gateway 20, local area network 30 and meters 40, in accordance with the present invention.

The basic architecture of the present invention is shown in FIG. 1. As mentioned, embedding an HTTP server and a TCP/IP protocol stack within a meter 40 or a gateway 20 to multiple meters through a local area network (LAN) 30 enables remote access to meter parameters on a continuous basis. As shown, a set of N meters 40 communicate through a non-TCP/IP type of LAN 30. The LAN 30 may be, e.g., a CEBus network employing power line or radio frequency communications (the Consumer Electronics Bus (CEBus) protocol has been adopted as an Electronics Industry Association standard (EIA IS-60), and defines a LAN that uses multiple media, including power line, radio, twisted pair, coaxial cable, and infrared signaling). Also connected to the LAN 30 is a gateway 20 that is also connected to a TCP/IP wide-area network (WAN) 10. Other applications (not shown) are also connected to the TCP/IP WAN 10 and may need to access the individual meters or groups of meters. These applications access individual meters by sending commands contained in packets with attached TCP/IP destination addresses that are unique to each meter.

In the first implementation of the invention (FIG. 2), the gateway 20 receives packets from other applications on the WAN 10. The gateway 20 includes a TCP/IP interface 22 and a LAN interface 28. The LAN interface 28 includes software for transforming the data packets into the format required for transmission on the LAN 30. The gateway 20 then transmits these reformatted packets over the LAN 30 to the meters 40. The steps involved in this transformation are:

1. The gateway examines the TCP/IP address of the packet and determines if it is the address of a meter or meters within the set attached to the gateway through its LAN. If not, the packet is ignored.
2. If the packet is intended for one of the meters on the gateway's LAN, the gateway examines the meter TCP/IP address attached to the packet and determines if it is an individual meter address or a broadcast address.
3. If the packet is addressed to an individual meter, then the gateway encapsulates the packet into a larger packet that is addressed to the meter using its unique LAN address (which is different from its TCP/IP address).
4. If the packet is meant for broadcast to all the meters, then the gateway encapsulates the packet into a larger packet addressed to the special broadcast address of the LAN (which is different from the TCP/IP broadcast address).
5. If the packet is larger than the maximum allowable packet size for the LAN, then the gateway segments the packet into smaller pieces. Each piece is labeled with the same LAN address as the original, larger packet.
6. Each piece of the segmented packet is transmitted onto the LAN for reception by one or more of the meters. The gateway is responsible for receiving acknowledgments of packet receptions from the meters, and for retransmitting packets if they are not received.

Each individual meter listens on the LAN for packets. A meter reconstitutes the original TCP/IP WAN packet from one or more LAN packets, and then executes the commands contained in the packet and sends the results back to the gateway. The steps involved in this process are:

1. The meter examines the LAN address of the packet to see if it is intended for this meter or is a broadcast address. If the address is neither of these, the meter ignores the packet.
2. If the packet is specifically addressed for the meter, an acknowledgment of reception is sent back to the gateway. If an error is found in the packet, a negative acknowledgment is sent back to the gateway. For broadcast transmissions, no acknowledgment is sent.
3. The received packet is appended to any previously received pieces of the larger segmented packet. When all of the pieces of the segmented packet are received, the entire original TCP/IP packet is extracted and sent to the TCP/IP interface software, in the meter.
4. The TCP/IP interface software examines the packet to see what service is being requested. In this case, assume the packet is intended for servicing by the HTTP server. (It is possible that there could be other servers running on the meter to which TCP/IP messages could be sent.)
5. The HTTP server examines the data packet to see what operation is being requested. In this case, assume that the packet contains a request that an application program be run on the meter to extract its current reading and send it back to the originator of the request. The HTTP server will initiate this application through the CGI.
6. The CGI application will query the meter application software to find the current reading. The meter application directly accesses the meter electronics to get the required information. The reading is passed back to the CGI application, which writes the reading into a message using HTML. The HTML message is sent back lo the HTTP server.
7. The HTTP server encodes the HTML message as a TCP/IP packet and sends it on to the meter's TCP/IP interface.
8. The meter's TCP/IP interface sends the packet to the gateway using the same set of steps that the gateway used to send the original request to the meter.
9. Once the gateway receives the TCP/IP packet from the meter, it retransmits the packet onto the WAN where the originating application for the command can receive it.

Figure 2:
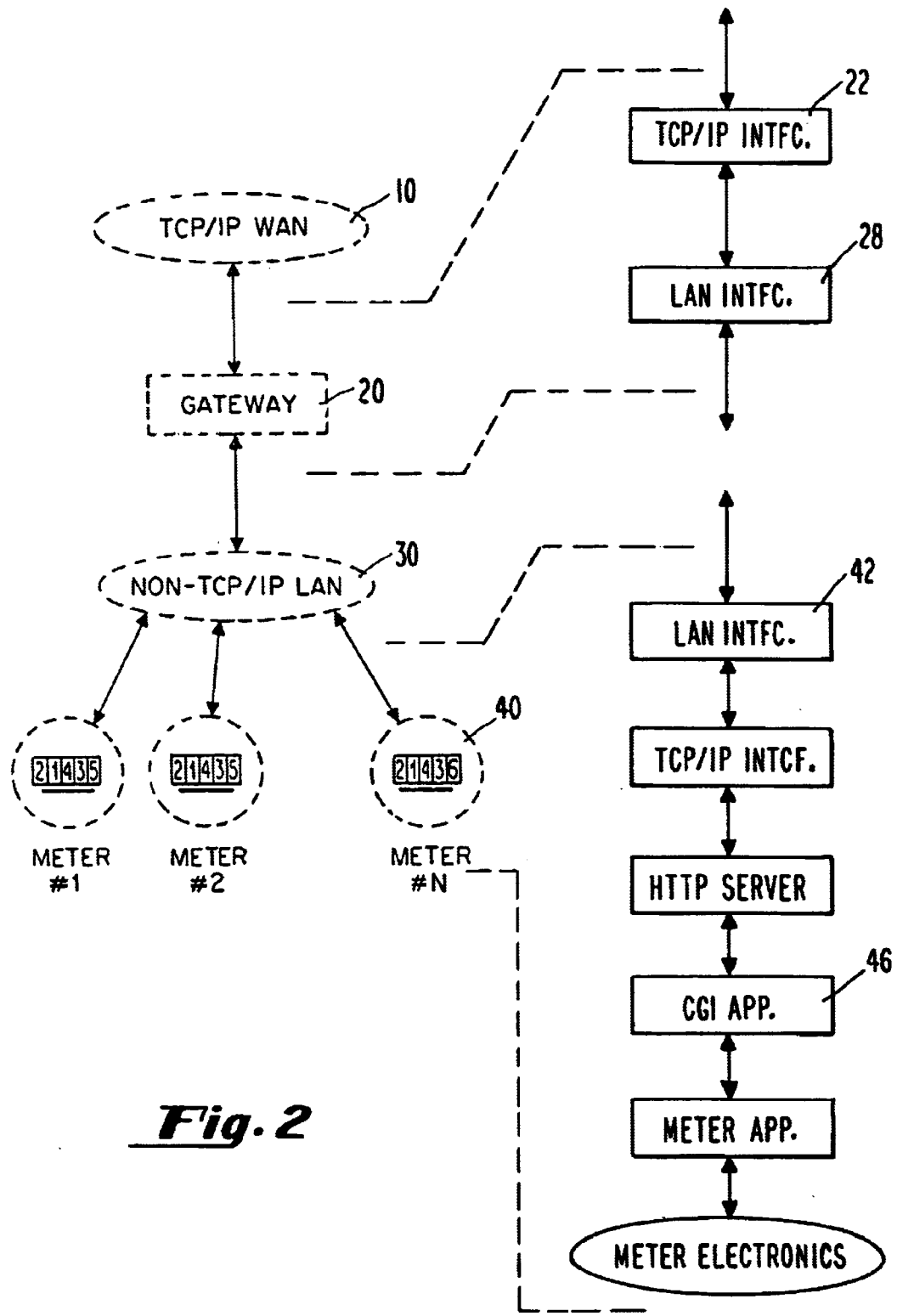
FIG. 2 schematically depicts an embodiment of the present invention in which an HTTP server and a common gateway interface are located in the meter(s) 40.
Figure 3:
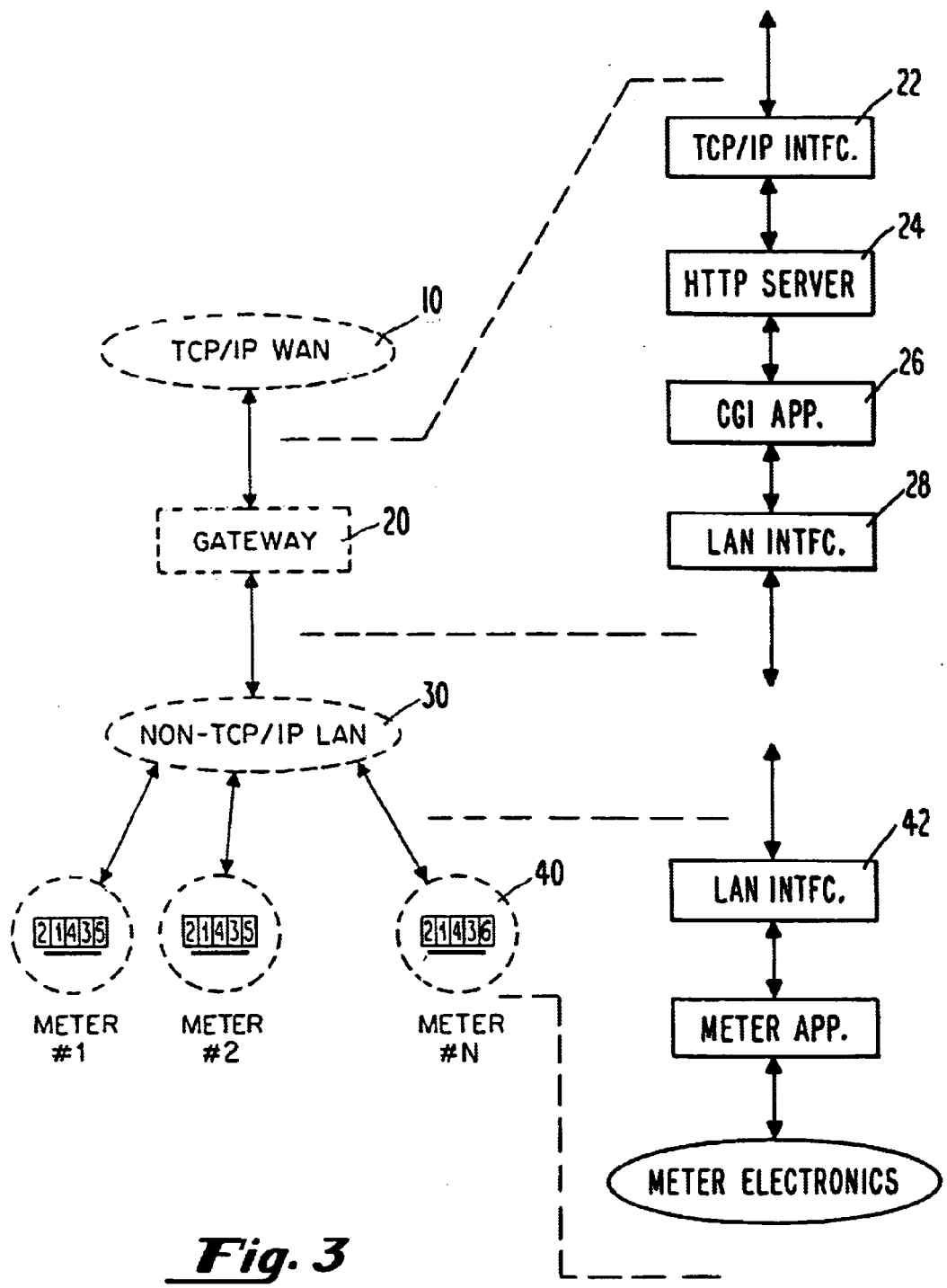
FIG. 3 schematically depicts an embodiment of the present invention in which an HTTP server and a common gateway interface are located in the gateway 20.

In the second embodiment of the invention (FIG. 3), the gateway assumes most of the tasks assigned to the meters in the first embodiment (FIG. 2). The HTTP server 24 and CGI application 26 are moved to the gateway 20, and the meters retain only their interface 42 to the non-TCP/IP LAN. The processing of packets received from the WAN 10 proceeds as follows:

1. The gateway examines the TCP/IP address of the packet and determines if it is the address of a meter or meters within the set attached to the gateway through its LAN. If not, the packet is ignored.
2. The TCP/IP interface software examines the packet to see what service is being requested. In this case, assume the packet is intended for servicing by the HTTP server now contained in the gateway. (It is possible that there could be other server applications running on the meter to which TCP/IP messages could be sent.)
3. The HTTP server examines the data packet to see what operation is being requested. In this case, assume that the packet contains a request that an application program be run to get the current reading of an individual meter and send it back to the originator of the request. The HTTP server will initiate this application through the CGI (26).
4. The CGI application 26 now runs within the gateway. It must determine the LAN address of the specified meter and send a command packet to it over the LAN.
5. The command is received by the meter and causes the meter application to query the electronics to find the current reading.
6. The meter reading is encapsulated into a LAN packet and sent back to the gateway.
7. The CGI application receives the LAN packet from the meter and extracts the meter reading. The reading is written into an HTML message and is sent back to the HTTP server.
8. The HTTP server encodes the HTML message as a TCP/IP packet and sends it on to the gateway's TCP/IP interface 22.
9. The gateway's TCP/IP interface 22 sends the packet onto the WAN 10 where the originating application for the command can receive it.

Figure 4:
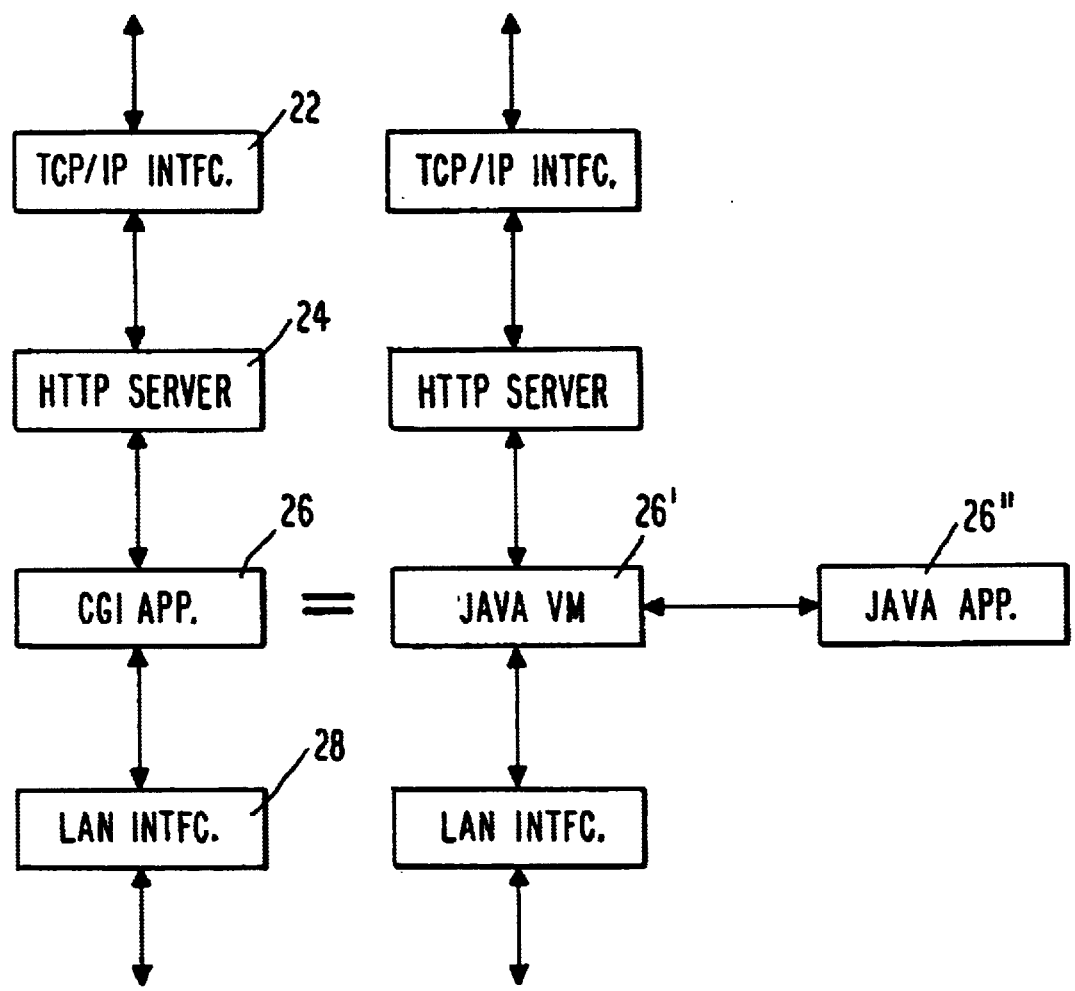
FIG. 4 illustrates how the common gateway interface could be replaced by a Java virtual machine and a Java applet.

Both implementations of the present invention have been described as using CGI applications 46, 26 to handle the details of accessing the current reading for a meter. As shown in FIG. 4, the CGI application could be replaced by a Java virtual machine (VM) 26' running a Java application 26" that performs the same operations as the CGI application.

In addition, both implementations have been described using an example where the current reading of an individual meter is requested by an application connected to the WAN. An application on the WAN can also write data to a meter or meters using similar procedures. The data could modify parameters affecting the operations of the meter or meters. An example would be rate updates.

Either implementation, with their use of TCP/IP and HTTP servers, supports the reading of meters or setting their parameters using browsers such as a Netscape™ or Explorer™. Utilities and homeowners could perform remote on-demand meter reading via their browsers. An individual meter or group of meters could be accessed as if the meter(s) were a web site and their current readings or other data could be displayed on the browser. The meters could send forms to the browser that the user could fill in to change parameters in the meters. Both reading and updating the meters would be protected by encryption and passwords.

Figure 5:
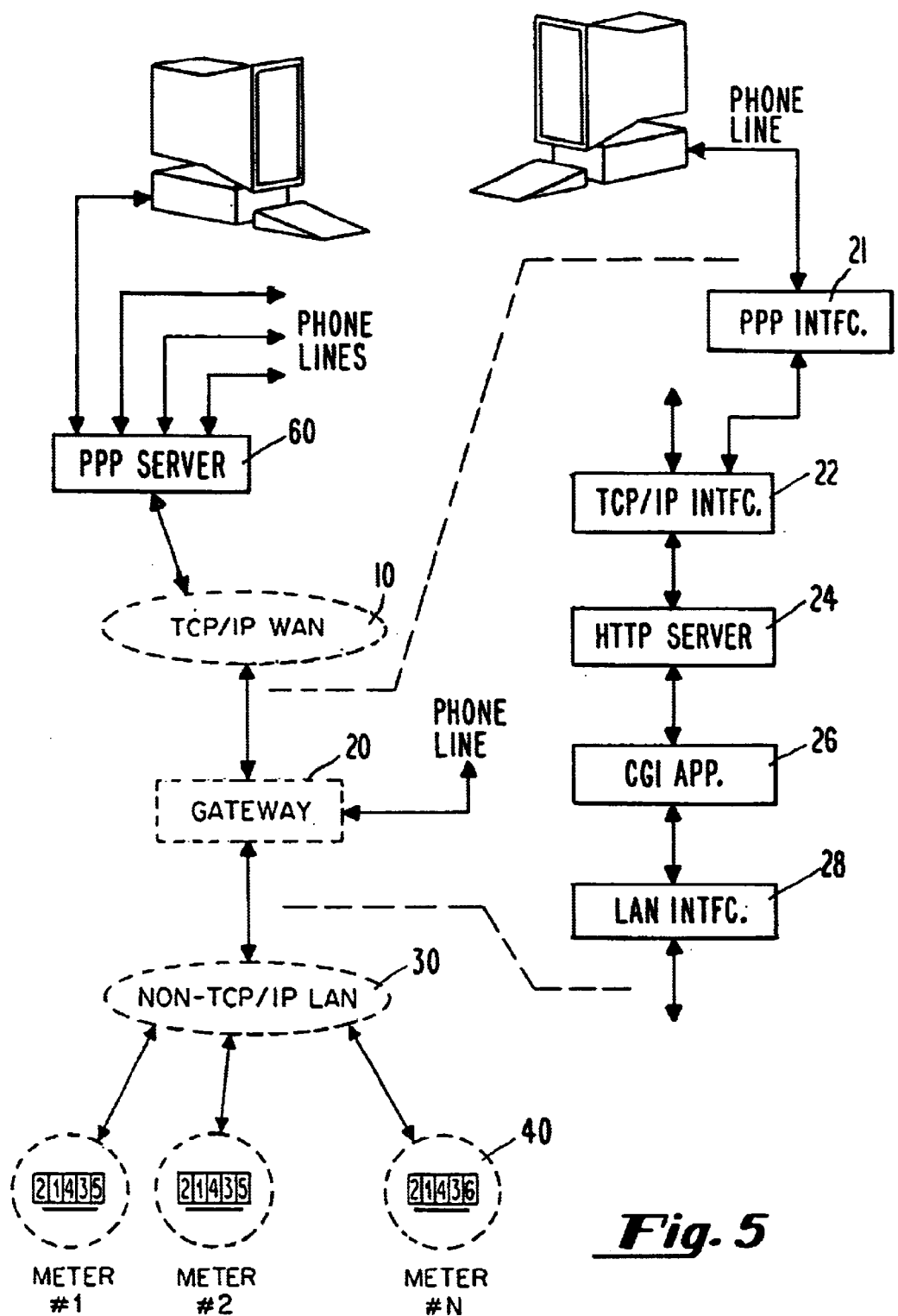
FIG. 5 portrays an embodiment of the invention in which one or more computers are given access to the meters by way of a PPP server or interface.

As shown in FIG. 5, a browser could gain access to the meters through a phone line to a Point-to-Point Protocol (PPP) server 60 attached to the WAN 10 or attached directly to a gateway 20. The PPP server interfaces with modems (not shown) to provide a TCP/IP link to a browser on the other end of the line. The PPP server sends the packets from the phone line onto the WAN where they are received by the appropriate gateway. In the case of a phone line connection directly to a gateway, the PPP software includes an interface 21 for directly connecting to the TCP/IP WAN interface 22 so that the packets received over the phone line are handled in the same way as packets received over the WAN 10.

The browser may be replaced by an intelligent application program that accesses the HTTP server for automated meter reading and parameter setting on a scheduled and repetitive basis. The application uses the meter readings to create or update records in a database. This application could be a Java application which can interact with the HTTP servers and databases that support the HTTP protocols.

In sum, the present invention includes the following novel aspects: (1) Embedded HTTP server in a meter for on-demand access to meter data and for remotely setting meter parameters; (2) Embedded HTTP server in a gateway to multiple meters to read and set parameters in individual meters on a LAN; (3) Using CGI for remote access to meter data and to set meter parameters using HTML forms in HTTP browsers; (4) Remote reading and setting of multiple meter parameters using TCP/IP protocol suite; (5) TCP/IP protocol suite implemented in designated nodes in a CEBus LAN including CEBus routers and brouters with remote access through TCP/IP to the router/brouter and, therefore, individual meters on a LAN; (6) SLIP-PPP enabled gateway for remote TCP/IP access through a serial interface (phone line, or ISDN, for example) to a single or multiple meter parameters (setting and reading).

The foregoing detailed description of preferred embodiments of the invention is not meant to limit the scope of protection of the following claims. Those skilled in the art of electronic metering will recognize that many modifications may be made to the presently preferred and specifically described embodiments without departing from the true spirit of the invention.

We claim:

1. An electronic metering system, comprising:
   (A) a wide area network (WAN) operating in accordance with a TCP/IP protocol;
   (B) a local area network (LAN) comprising at least one meter which includes meter electronics for measuring a prescribed commodity supplied by a utility and memory for storing measured data and meter control parameters;
   (C) a gateway operatively coupled to said LAN and said WAN; and
   (D) an HTTP server, embedded in one of said gateway and said meter, for accessing said measured data and meter control parameters, whereby said WAN is provided remote access to said measured data and meter control parameters.

2. A system as recited in claim 1, and further comprising a common gateway interface (CGI) application coupled to said server for use in accessing said measured data.

3. A system as recited in claim 1, and further comprising a virtual machine coupled to said server for use in accessing said data.

4. A system as recited in claim 1, wherein said prescribed commodity is electricity.

5. A system as recited in claim 1, wherein said prescribed commodity is gas.

6. A system as recited in claim 1, wherein said prescribed commodity is water.

7. A system as recited in claim 2, wherein said HTTP server and CGI application are embedded in each of said meters.

8. A system as recited in claim 2, wherein said server and CGI application are embedded in said gateway.

9. A system as recited in claim 1, wherein each of said meters further comprises a LAN interface.

10. A system as recited in claim 1, wherein said gateway comprises a LAN interface.

11. A system as recited in claim 7, wherein each of said meters further comprises a TCP/IP interface.

12. A system as recited in claim 1, wherein said gateway comprises a TCP/IP interface.

13. A system as recited in claim 1, and further comprising a common gateway interface (CGI) application coupled to said server for use in accessing said measured data; wherein said server and CGI application are embedded in each of said meters; wherein said gateway and each of said meters comprises a LAN interface and a TCP/IP interface; and wherein said prescribed commodity is a member of the group consisting of electricity, water and gas.

14. A system as recited in claim 1, and further comprising a common gateway interface (CGI) application coupled to said server for use in accessing said measured data; wherein said server and CGI application are embedded in said gateway; wherein each of said meters and said gateway comprises a LAN interface; wherein said gateway further comprises a TCP/IP interface; and wherein said prescribed commodity is a member of the group consisting of electricity, water and gas.

15. A system as recited in claim 1, wherein said LAN is a CEBus LAN.

16. A system as recited in claim 13, wherein said LAN is a CEBus LAN.

17. A system as recited in claim 14, wherein said LAN is a CEBus LAN.

18. An electronic meter, comprising:
   meter electronics for measuring a prescribed commodity supplied by a utility;
   a memory for storing measured data and meter control parameters; and
   an HTTP server, embedded in one of said gateway and said meter, operatively coupled to said meter electronics and memory;
   said electronic meter being configured for use in a system including a wide area network (WAN) operating in accordance with a TCP/IP protocol, wherein said WAN is provided with remote access to said measured data and control parameters of said electronic meter.

19. An electronic meter as recited in claim 17, further comprising a local area network (LAN) interface and a TCP/IP interface operating in the meter, wherein said meter is configured for use in a system including a LAN and a gateway operatively coupled to the LAN and the WAN.

20. An electronic meter as recited in claim 19, further comprising a common gateway interface (CGI) application and a meter application operating in the meter.

21. A gateway for use in a system comprising an electronic meter connected to the gateway and a wide area network (WAN) operating in accordance with a TCP/IP protocol, wherein the electronic meter is operatively coupled to the WAN through the gateway, the gateway comprising:
an HTTP server, embedded in one of said gateway and operatively coupled to said electronic meter or in said electronic meter and operatively coupled to said gateway, whereby said WAN is provided with remote access, via the gateway, to measured data and control parameters of the electronic meter.

22. A gateway as recited in claim 21, further comprising a local area network (LAN) interface and a TCP/IP interface embedded in the gateway.

23. A gateway as recited in claim 21, further comprising a common gateway interface (CGI) application operating in the gateway.

24. A method for operating an electronic metering system, comprising:
(A) providing a wide area network (WAN) operating in accordance with a TCP/IP protocol;
(B) coupling the WAN to a local area network (LAN), wherein the LAN is coupled to at least one meter which includes meter electronics for measuring a prescribed commodity supplied by a utility and memory for storing measured data and meter control parameters;
(C) providing an HTTP sever, embedded in one of said gateway and said meter, for accessing said measured data and meter control parameters; and
(D) providing said WAN with remote access to said measured data and control parameters of said meter.

25. A method as recited in claim 24, wherein said WAN is coupled to said LAN via said meter, and wherein said meter further includes a gateway.

26. A method as recited in claim 24, wherein the server comprises a common gateway interface (CGI) application.

27. A method as recited in claim 24, wherein the meter further comprises a LAN interface.

28. A method as recited in claim 24, wherein the meter further comprises a WAN interface.

29. A method as recited in claim 24, wherein said WAN is coupled to said LAN via said meter; wherein said meter further includes a gateway, a WAN interface and a LAN interface; and wherein the server is embedded in the meter and comprises an HTTP server and a common gateway interface (CGI) application.

30. A method for operating an electronic metering system, comprising:
(A) coupling a WAN operating in accordance with a TCP/IP protocol to at least one meter, said meter comprising meter electronics for measuring a prescribed commodity supplied by a utility, memory for storing measured data and meter control parameters, and a server application running on an HTTP server embedded in one of a gateway and said meter; and
(B) providing said WAN with remote access to said measured data and control parameters of said meter, wherein communications between the WAN and the meter are in accordance with a TCP/IP protocol.

31. A method as recited in claim 30, wherein said WAN is coupled to a local area network (LAN) via said meter, and wherein said meter further includes a gateway.

32. A method as recited in claim 30, wherein the server application comprises an HTTP server application.

33. A method as recited in claim 30, wherein the server application comprises a common gateway interface (CGI) application.

34. A method as recited in claim 30, wherein the meter further comprises a LAN interface.

35. A method as recited in claim 30, wherein the meter further comprises a WAN interface.

36. An electronic meter for use in an electronic metering system in which access to metered data and control parameter is provided to one or more devices on a wide area network (WAN) operating in accordance with a TCP/IP protocol, comprising meter electronics for measuring a prescribed commodity supplied by a utility, memory for storing measured data and meter control parameters, and a server application running on an HTTP server embedded in one of a gateway and said meter.

37. An electronic meter as recited in claim 36, wherein communications between the WAN and the meter are in accordance with a TCP/IP protocol.

38. An electronic meter as recited in claim 36, wherein said meter further includes a gateway, whereby said WAN can be coupled to a local area network (LAN) via said meter.

39. An electronic meter as recited in claim 36, wherein the server application comprises an HTTP server application.

40. An electronic meter as recited in claim 36, wherein the server application comprises a common gateway interface (CGI) application.

41. An electronic meter as recited in claim 36, wherein the meter further comprises a LAN interface.

42. An electronic meter as recited in claim 36, wherein the meter further comprises a WAN interface.

* * * * *

UNITED STATES PATENT AND TRADEMARK OFFICE
CERTIFICATE OF CORRECTION

PATENT NO.    : 6,747,981 B2                                              Page 1 of 1
DATED         : June 8, 2004
INVENTOR(S)   : Sasan H. Ardalan and David E. Van den Bout It is certified that error appears in the above-identified patent and that said Letters Patent is hereby corrected as shown below:

Column 3,
Line 66, "sent back lo" should read -- sent back to --.

Column 6,
Line 65, "as recited in claim 17" should read -- as recited in claim 18 --.

Signed and Sealed this

Twenty-eighth Day of December, 2004

JON W. DUDAS
*Director of the United States Patent and Trademark Office*